Oct. 7, 1969  G. E. BARKER  3,470,892
PULSED SOLENOID CONTROL VALVE
Filed Sept. 15, 1965  4 Sheets-Sheet 2

INVENTOR
GEORGE E. BARKER
BY
*Robert J. Schaap*
ATTORNEY

Oct. 7, 1969 G. E. BARKER 3,470,892
PULSED SOLENOID CONTROL VALVE
Filed Sept. 15, 1965 4 Sheets-Sheet 3

INVENTOR
GEORGE E. BARKER
BY
*Robert J. Schaap*
ATTORNEY

3,470,892
PULSED SOLENOID CONTROL VALVE
George E. Barker, St. Louis, Mo., assignor to Monsanto Company, St. Louis, Mo., a corporation of Delaware
Continuation-in-part of application Ser. No. 412,921, Nov. 23, 1964. This application Sept. 15, 1965, Ser. No. 487,537
The portion of the term of the patent subsequent to Jan. 28, 1986, has been disclaimed
Int. Cl. G05d *9/12;* F16k *1/54, 31/02*
U.S. Cl. 137—1                                               7 Claims

ABSTRACT OF THE DISCLOSURE

A pulsed-solenoid control valve having a valve plunger which shifts with respect to a valve seat. The plunger is biased to the valve-closed position where the plunger engages the valve seat by the action of a magnetic force when the solenoid is energized. The valve plunger is permitted to move away from the valve seat by the force of gravity and any pressure differentials across the valve. The valve operates in a dithering mode and the valve plunger lift-time history is controlled so that the valve plunger moves through repetitive cycles which comprise an opening period, a closing period and a quiescent period. During the opening period, the valve plunger never reaches the lowermost or remote position with respect to the valve seat and never engages the lower stop; and during the quiescent period the valve plunger assumes a position of dynamic rest with a simultaneous zero velocity and zero aceleration. The fluid flow or valve opening is determined by the integral of the lift-time history of the valve plunger.

---

This application is a continuation-in-part of my copending application Ser. No. 412,921, filed Nov. 23, 1964, and now Patent No. 3,424,951, and which relates to electrically operated control valves.

This invention relates in general to certain new and useful improvements in control valves and more particularly, to an electrically operated control valve which is capable of modulating action and which operates on a force-balance principle.

Recently, the use of electronic instrumentation has grown steadily in the chemical process industries. Today, it is not uncommon to find entire chemical processing plants which are provided with the necessary instrumentation for a complete electrical control. In fact, there have been many recent discoveries of instrumentation which are capable of process sensing and generation of control signals. A wide variety of process sensing and control generation instruments of this type are readily available and are adaptable to a multitude of applications.

However, the final control element, such as a modulating flow control valve, has not kept pace with the advancements in instrumentation for electrical control and generally is still pneumatically operated, such as the typical air-motor valve. Pneumatically operated control valves, such as the air-motor control valve was a logical development in chemical process instrumentation of the past, since many of the sensors used in processing equipment generated pneumatic pressure signals directly. Consequently, the air-motor control valve and similar devices filled a direct need. However, the presently available pneumatically operated control elements are not suitable for high response instrumentation required in modern automatic process control.

The recent developments in sensory equipment and control signal equipment for chemical processes require a fast-response control device. It is difficult to achieve a fast-response device with long pneumatic transfer lines associated with pneumatically operated control elements such as the conventional air-operated control valves. Although many manufacturers have attempted to produce a completely electric control valve, the valves thus far produced have not been completely successful. The existing electric control valves are generally constructed with an electric motor substituted for the air-motor and are, therefore, relatively expensive. Moreover, electric valves of this type are relatively slow in response compared to the rapid signals achieved by the recent sensory and control signal equipment. Furthermore, such valves are difficult to make "fail-safe" in the event of a power failure. Aside from the above, the other performance specifications for control valves and similar position control systems have become increasingly stringent, as the means realizing such systems have become increasingly complicated. In view of the limitations of pneumatic systems, the presently available control elements do not have a wide dynamic range and have a relatively low response speed. Furthermore, these control elements are characterized by a lack of precision and a relatively high inherent hysteresis, which affects the efficiency of the control elements.

The presently existing commercially available control valves are not capable of exhibiting a wide degree of utility. For example, the design of these control valves does not lend itself for construction of control valves of laboratory scale, pilot plant scale and commercial scale operation. Moreover, the presently available control valves or final control elements are not capable of being used in other than fluid flow control applications. For example, the presently existing final control elements could not be used in a dual function, such as a control valve and a pressure transmitter, or a transducer or similar type of sensor.

It is, therefore, the primary object of the present invention to provide a pulsed solenoid control valve which is capable of controlling flow over a wide dynamic range.

It is another object of the present invention to provide a pulsed solenoid control valve of the type stated which is relatively simple in its operation and has a long operating life.

It is a further object of the present invention to provide a pulsed solenoid control valve of the type stated which can be used in both low pressure and high pressure fluid systems.

It is an additional object of the present invention to provide a pulsed solenoid control valve of the type stated which is adaptable for use in bench-scale equipment, pilot-plant equipment and commercial process equipment.

It is another salient object of the present invention to provide a pulsed solenoid control valve of the type stated which can be built into a small compact unit, which is relatively inexpensive to manufacture and has a high degree of reliability.

It is still another object of the present invention to provide a pulsed solenoid control valve of the type stated which can be used as a force balance device and which is capable of generating internal negative feedback for improved flow stability.

With the above and other objects in view, my invention resides in the novel features of form, construction, arrangement and combination of parts presently described and pointed out in the claims.

In the accompanying drawings:

FIGURES 6, 7, 8, 9 and 10 are diagrammatic electrical wave forms illustrating the operation of the circuit of FIGURE 5, of which:

GENERAL DESCRIPTION

The term "pulsed solenoid" with regard to control valves is a new concept in the art of control valves. In my copending application Ser. No. 412,921, filed Nov. 23, 1964, the theory of pulsed-solenoid operation of normally closed control valves is described in detail. Pulsed-solenoid flow control in said copending application is understood to be the operation of a solenoid valve in such manner as to cause the plunger to vibrate off of the valve seat. Flow control is achieved by controlling the vibrational amplitude of the valve plunger through control of the current to the solenoid, thus, achieving an electrically actuated modulating valve. Pulsed-solenoid control action in the normally closed control valve also assumes that the maximum magnetic force generated by the solenoid coil must be greater than the resultant of all forces tending to close the valve plunger. This type of action also assumes that the magnetic force averaged over the power cycle must be less than the force shifting the valve plunger away from the closed position.

Generally speaking, the present invention resides in a pulsed-solenoid control valve which is capable of modulating control action by varying the voltage supplied to the coil of the control valve. The valve is designed to control fluid flow in response to changes of a measured physical variable, such as liquid level. The pulsed-solenoid control valve of the present invention exhibits a wide degree of versatility and can also be used as a force-balance device. The force-balance device of the present invention can also, in turn, be used as a pressure transmitter, a flow meter, a liquid level detector, a pneumatic ratio controller, a ratio totalizer, or in many other applications where a force-balance device would find employment. Accordingly, it can be seen that the pulsed-solenoid control valve of the present invention may also find employment as a liquid level controller, a differential pressure controller, or a temperature controller.

The control valve includes a valve housing with a fluid inlet port at the upper end thereof. Internally disposed within the housing is a fluid tube and shiftedly disposed within the fluid tube is a valve plunger, which in turn carries a valve seat. The upper end of the housing is closed and provides a fluid port admitting fluid into the interior of the housing. However when the valve plunger is at its uppermost position, the valve seat will engage the underside of the upper stop, thereby preventing fluid flow. When the valve plunger is moved away from the upper stop, fluid is permitted to flow around the sides thereof and out through a valve port at the lower end of the valve housing. The valve plunger is actuable by a solenoid coil which is associated with the housing and surrounds the valve plunger.

In the operation of the valve of the present invention, the plunger is biased away from the closed position by the combination of a spring, if employed, gravity or differential pressure forces. The magnetic force is generated by a pulsating current in a control circuit. The pulsating current, however, is a direct current and of average magnitude which is sufficient to overcome the opening bias force. The minimum magnetic force, however, is less than the bias force. In this manner, the plunger is, on the average, held against the valve in the closed position, but vibration off of the valve seat is permitted by the current reduction accompanying negative control pulses.

A control circuit is provided for measuring the changes in the sensed physical variable. The control circuit may include a sensor for measuring this change and a mechanism for converting the measured physical variable change into a proportional electrical change. The control circuit also includes a relaxation oscillator which is designed to convert this proportional electrical change into a sequence of timed pulses. Finally, a silicon controlled rectifier is provided for transmitting current pulses in timed relation to the solenoid coil for actuating the plunger. In the control circuit, the current reaches a maximum and begins to decline after the firing of the silicon controlled rectifier. Current decline will occur up to a point where the voltage across the solenoid coil reverses. A free-wheeling diode in the control circuit diverts the coil current from the silicon controlled rectifier allowing it to commutate and the coil current is dissipated by a current-resistance drop in the coil. This inductive decay will continue until the next firing of the silicon controlled rectifier where the current repeats. In effect, it is thereby possible to maintain controlled vibration of the valve plunger for regulating fluid flow in proportion to the change of the sensed physical variable.

The present invention also describes the use of the pulsed-solenoid control valve as a pilot valve in a plant-scale control valve application. Similarly, the present invention also contemplates the use of a pulsed-solenoid control valve as a resistance pneumatic transducer having linear characteristics. The flow rate through the valve is a linear function of its control resistance and of the control voltage. Consequently, it is possible to produce an electropneumatic transducer with linear characteristics. The term "pulsed solenoid" when used in the present application has reference to the mode of operation of the control valve described herein. The present control valve is a normally open valve and, therefore, a "reverse acting" valve when compared to the normally closed valve described and illustrated in said copending application. The term "pulsed solenoid" as used herein is understood to be the operation of a solenoid valve in a manner where the plunger is biased away from the closed position by gravity or differential pressure forces and a spring, if employed. A direct current of average magnitude is used for creating a magnetic force to overcome the opening force for biasing the plunger to the closed position. Therefore, the plunger is on the average held in the closed position and vibration off of the valve seat is permitted by current reduction accompanying negative control pulses.

Figures 1, 2, 3, 4:
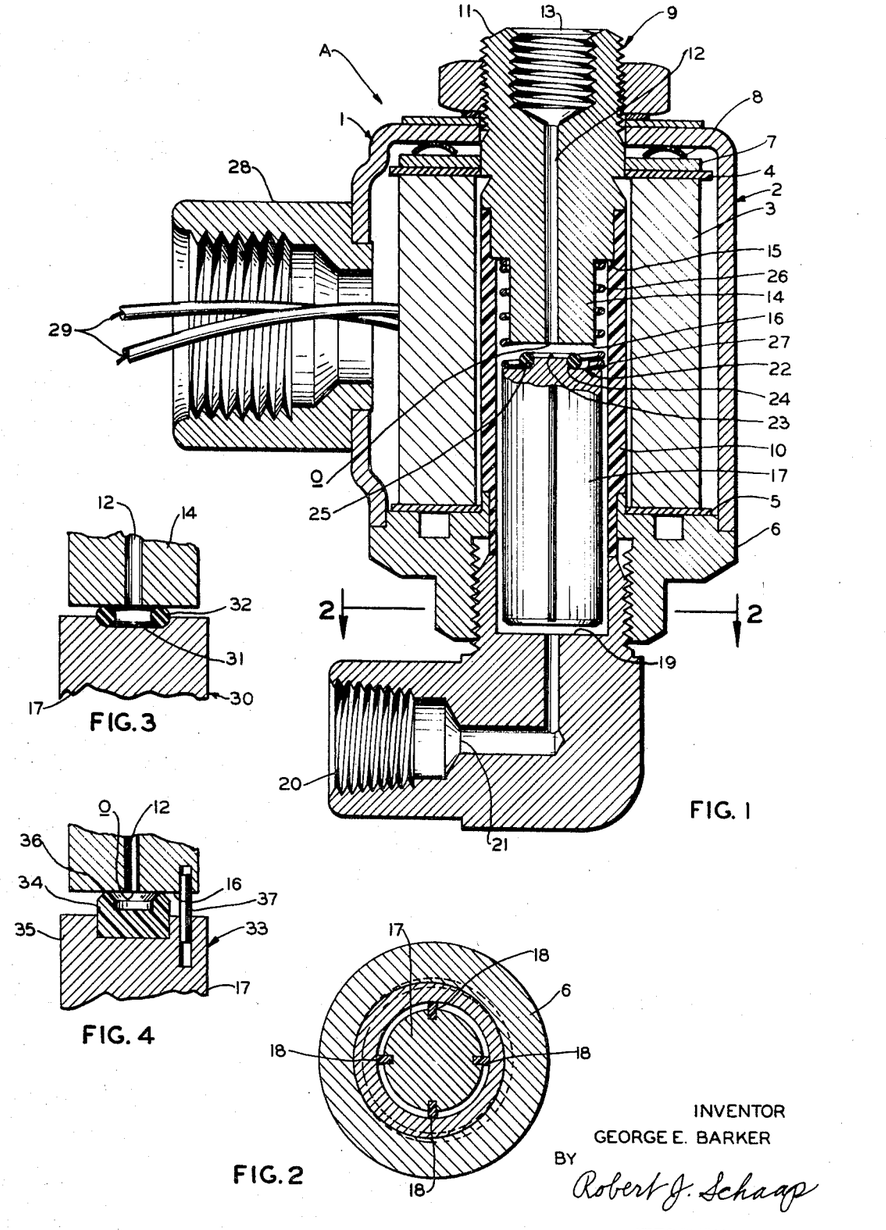
FIGURE 1 is a vertical sectional view, partially broken away, of a pulsed solenoid control valve constructed in accordance with and embodying the present invention.
FIGURE 2 is a fragmentary sectional view taken along line 2—2 of FIGURE 1.
FIGURE 3 is a fragmentary sectional view of a modified form of valve seat constructed in accordance with and embodying the present invention.
FIGURE 4 is a fragmentary sectional view of another modified form of valve seat which is constructed in accordance with and embodies the present invention.
Figure 5:
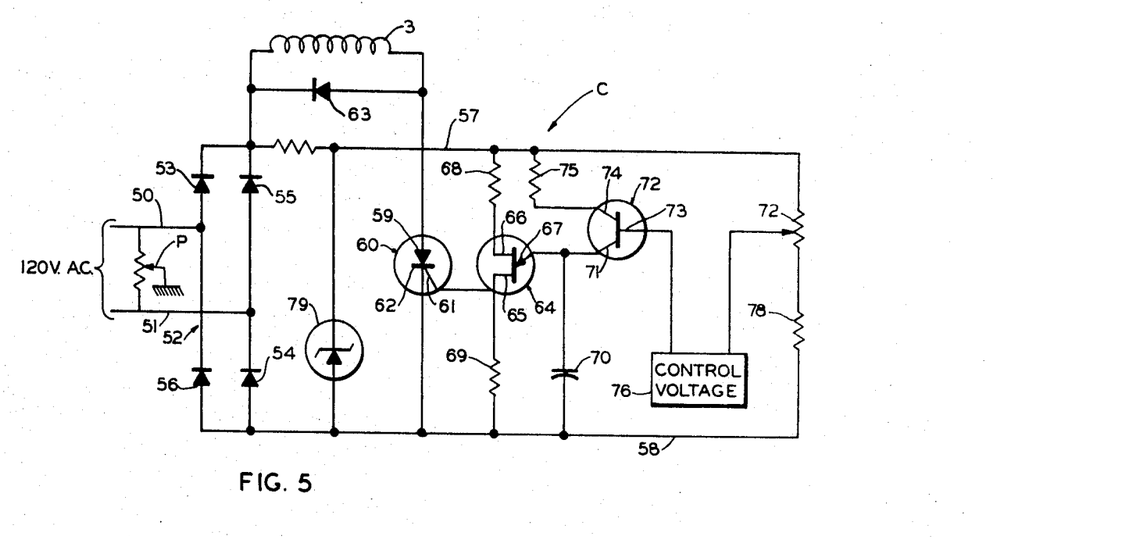
FIGURE 5 is a diagrammatic view of a control circuit forming part of the pulsed solenoid control valve of FIGURE 1.

Referring now in more detail and by reference characters to the drawings which illustrate practical embodiments of the present invention, A designates a pulsed-solenoid control valve, substantially as shown in FIGURES 1 and 2, with modifications thereof illustrated in FIGURES 3 and 4. The control valve A is operatively connected to and operable by a control circuit C, substantially as shown in FIGURE 5. The control valve A and control circuit C are hereinafter described in more retail.

CONTROL VALVE

The control valve A generally comprises an outer control valve housing 1 including a somewhat cylindrical coil housing 2. Disposed within the housing 2 in a helically wound cylindrical solenoid coil 3 and disposed upon opposite ends thereof are upper and lower insulating washers 4 and 5, respectively. The insulating washer 5 is facewise disposed upon the upper surface of a base plate 6 which forms part of the outer coil housing 2. Facewise disposed upon the upper insulating washer 4 is a circular flux plate 7. The assembly of the solenoid coil 3, the insulating washers 4, 5 and the flux plate 7 is suitably held in place and urged downwardly toward the base plate 6 by means of a set of flat springs 8. By reference to FIGURE 1, it can be seen that the springs 8 are interposed between the upper surface of the flux plate 7 and the undersurface of the top wall forming part of the coil housing 2.

The coil housing 2 and the solenoid coil 3 are centrally apertured to accommodate a plunger tube assembly 9 which comprises a cylindrical tube 10 disposed axially within the coil housing 2 and which contains a central non-magnetic section surrounded by magnetic sections at each of the transverse ends. A cylindrcial plug 11 is fitted in the upper end of the tube 10 and extends interiorly into the housing in the manner as shown in FIGURE 1. The plug is axially bored in the provision of a fluid inlet channel 12 which communicates with the interior of the cylindrical tube 10. The plug 11 is also integrally provided with an outwardly extending fitting 13 which is internally threaded to accommodate standard pipe fittings. The plug 11 is further diametrically reduced in the provision of a downwardly extending boss 14 forming an annular shoulder 15 for reasons which will presently more fully appear. The boss 14 is further provided with a relatively flat bottom face 16, which serves as an upper plunger stop or seating surface. The fluid inlet channel 12 opens into the tube 10 at the bottom face 16 in the form of an orifice O.

Reciprocatively disposed within the tube 10 and being adapted for vibratory movement therein is a valve plunger 17, which is cylindrical in horizontal cross-section. The plunger 17 is slightly diametrally smaller than the tube 10 in order to permit fluid which flows into the interior of the tube 10 through the inlet port 12 to flow therearound. In order to prevent undue vibration of the valve plunger 17, the plunger is provided with four radially spaced axially extending flutes which are fitted with spacer strips 18 and which, in turn, are spaced sufficiently from the interior of the wall of the tube 10 in order to permit axial vibratory movement of the plunger but prevent radial vibratory movement thereof. The spacer strips 18 are preferably formed of a tetrafluoroethylene polymer normally marketed under the trademark "Teflon." Furthermore, the plunger 17 may be sized to fit snugly but nevertheless shiftably within the tube 10 and may be provided with radially spaced axially extending fluid ducts as desired for permitting fluid flow. The valve plunger 17 is movable between the upper stop 16 and a lower stop 19 formed by a retaining plate secured to the lower end of the tube 10, in the manner as shown in FIGURE 1. The retaining plate 19 is suitably apertured to permit the fluid in the tube 10 to flow outwardly therefrom and into a standard fitting 20 having a discharge port 21. The pipe fitting 20 is internally threaded to accommodate standard pipes or similar fittings in the manner as shown in FIGURE 1. A valve seat 22 is formed on the upper end of the plunger 17 and includes an upstanding diametrally reduced boss 23 forming an annular shoulder 24. Rigidly fitted against the shoulder 24 is a seating ring 25, which is diametrally larger than the boss 23 and extends upwardly from the uppermost end of the valve plunger 17. The seating ring 25 is preferably formed of a suitable flexible plastic or rubber material, for example, a polybutadiene rubber such as the type sold under the trademark "Buna-N." The valve plunger 17 is biased downwardly by means of a compression spring 26 which bears against the shoulder 15 on the plug 11 and an upwardly presented shoulder 27 formed on the valve plunger 17.

In connection with the present invention, it should be understood that the spring 26 is not necessary, but may be employed as desired. The relative merits of employing a spring such as the spring 26 to bias the plunger downwardly is discussed hereinafter in detail. Furthermore, it should be recognized that the seating ring 25 must be formed of a fairly flexible material which is capable of forming an air-tight seal around the orifice O on the flat bottom face 16.

The seating material further has a strong effect on secondary or rebound vibrations of a vibrating plunger. In general, the secondary vibrations are undesirable inasmuch as they adversely affect the stability of the valve. Moreover, much of the noise associated with a pulsed-solenoid type of operation is produced by secondary or rebound vibrations. In connection with the present invention, it was found that a seat of a polybutadiene rubber such as the type sold under the trademark "Buna-N" rubber produced the most desirable results of any of the materials analyzed. Other suitable rubber materials which are capable of being used in forming the seating ring 25 are chloroprene and various polybutadiene-styrene rubbers. Similarly, butadiene-acrylonitrile rubbers are also very useful, inasmuch as these rubbers have a great deal of low temperature flexibility.

The valve A is also provided with a fitting 28 for accommodating a pair of leads 29 to the solenoid coil 3 in the manner as shown in FIGURE 1. The leads 29 are ultimately connected to the control circuit C in FIGURE 5, in a manner to be hereinafter described in detail.

It is possible to provide a modified form of valve seat 30, substantially as shown in FIGURE 3, and which is similar to the previously described valve seat 22. The valve seat 30 comprises a circular recess 31 formed in the upper end of the valve plunger 17. The recess 31 is of such diametral size to snugly accommodate a seating ring 32, which is substantially identical to the previously described seating ring 25. The seating ring 25 fits snugly around the upstanding boss 23, whereas the seating ring 32 fits snugly against the vertical wall of the recess 31. Furthermore, the seating ring 32 may be retained in position by means of a suitable adhesive such as an epoxy resin. Again, it can be observed by reference to FIGURE 3 that the ring is of sufficient diametrical size so that it extends above the top face of the valve plunger 17 and engages the seating face 16.

It is possible to provide another modified form of valve seat 33, substantially as shown in FIGURE 4. The valve seat 33 is a preferred form of valve seat when it is desired to use a more rigid valve seat material such as Teflon. The valve seat 33 generally comprises a Teflon plug 34, which is snugly fitted within a circular recess 35 formed in the upper end of the valve plunger 17. By reference to FIGURE 4, it can be seen that the Teflon plug 34 extends above the upper surface of the plunger 17 and includes an annular upwardly extending knife-like edge 36. By further reference to FIGURE 4, it can be seen that the edge extends annularly around the orifice O and engages the seating face 16. The plug 34 is provided with the knife edges 36 so that the edges 36 will engage the seating face 16 on the first contact and become deformable upon contact therewith. As long as the radial orientation of the valve plunger 17 does not change with respect to the seating face 16, a perfect fluid-tight seating arrangement is always maintained. The Teflon material is capable of cold-flowing so that it conforms to the lack of concentricity of the seating face 16. However, this type of seating arrangement is lost in the event that radial orientation takes place. Accordingly, a key 37 fitted within slots formed in the plug 11 and the valve plunger 17 prevents radial reorientation but permits the axial shifting movement of the plunger 17 with respect to the plug 11.

CONTROL CIRCUIT

The control circuit, as schematically illustrated in FIGURE 5, is powered from a 120 volt source of alternating current (not shown) and includes a pair of conductors 50, 51 and which are, in turn, connected to a diode bridge 52 including diode sets 53, 54 and 55, 56. A balancing potentiometer P is connected across the conductors 50, 51 in the manner as shown in FIGURE 5. Connected to the opposite terminal of the diode bridge 52 is a B+ conductor 57 and a B— conductor 58.

One terminal of the solenoid coil 3 is connected to the common connection of the B+ conductor 57 and the diode bridge 52. The opposite terminal of the solenoid coil 13 is connected directly to the anode 59 of a silicon-controlled rectifier 60, which also includes a gate 61 and a cathode 62, the latter in turn being connected directly to the B— conductor 58. Connected across the solenoid coil 3 in a shunting relationship is a free-wheeling diode 63. If desired, a temperature compensating resistor, often termed thermistor (not shown) can be interposed between the silicon controlled rectifier 60 and the solenoid coil 3 to compensate for undesirable temperature effects. The firing angle of the basic voltage output of the control circuit C to the solenoid coil 3 is, of course, controlled by measured changes in a sensed physical variable. This change is measured in the form of a control voltage which is provided by any suitable electrical controller and is hereinafter discussed in more detail.

The basic timing device that controls the firing angle of the circuit in relation to the measured change in the physical variable is a unijunction transistor 64 which is provided with a base–1 65, a base–2 66 and an emitter 67. The base–2 66 is connected through a temperature compensating resistor 68 to the B+ conductor 57 and the base–1 65 is connected through a fixed resistor 69 to the B— conductor 58.

The emitter 67 of the unijunction transistor 64 is connected to a capacitor 70, which is in turn connected to the B— conductor 58. The emitter 67 is also connected directly to a collector electrode or so-called "collector" 71 of a P-N-P transistor 72, the latter serving as a "degenerated common emitter" and including a base electrode or so-called "base" 73 and an emitter electrode or so-called "emitter" 74. The emitter electrode 74 is in turn connected through a high impedance resistor 75 to the B+ conductor 57.

As indicated above, the firing angle of the basic volatge output of the control circuit C is controlled by the change in the measured physical variable. This change is measured in the form of a control voltage which is provided by a suitable electrical controller and is designated in FIGURE 5 as a control voltage source 76, one terminal of which is connected to the base electrode 73 of the degenerated common emitter transistor 72. The opposite terminal of the control voltage source 76 is connected to a setpoint potentiometer 77, which is in turn connected to one terminal of the B+ conductor 57 and through a fixed resistor 78 to the B— conductor 58. Also connected across the B+ conductor 57 and the B— conductor 58 is a Zener diode 79.

OPERATION OF THE CONTROL CIRCUIT

In order to describe the operation of the control circuit, it must be recognized that the control voltage source 76 is representative of the function which is being measured. It should, therefore, be understood that the control voltage source 76 can be conveniently replaced by a suitable sensory mechanism for measuring the changes of a physical variable which is capable of being converted into voltage changes. Consequently, it can be seen that the basic firing angle of the output voltage to the solenoid coil 3 is controlled by changes in the sensed physical variable. Inasmuch as the sensed change of the physical variable is capable of being translated into an electrical change such as a voltage or current change, this change can be physically represented by the control voltage source 76.

The circuit of the present invention differs from the circuit described in my copending application Ser. No. 854,244, filed May 24, 1965, now abandoned, in that this circuit employs a fullwave D.C. current, whereas in the aforementioned application, a half-wave current was employed which would flow through the load in the same direction at all times. The circuit of the present invention only employs a single silicon controlled rectifier and, therefore, the diode bridge 52, which serves as a rectifier, is employed. The current from the source of electrical current, which is generally a Sola 120 volt A.C. current transformer flows through the various diode pairs 53, 54, 55 and 56 depending on whether the pairs are positive or negative. Thus, current will flow through the conductor 50 to the diode 53, through the load or solenoid coil 3 and the silicon controlled rectifier 60, when the latter is conducting. Current will flow back through the silicon controlled rectifier 60, through the diode 54 and the conductor 51. However on reversal, current will flow in through the conductor 51, through the diode 55 and the solenoid coil 3, when the silicon controlled rectifier 60 is conducting. Current will thereafter flow from the silicon controlled rectifier 60 through the diode 56 into the conductor 50.

As a change occurs in the measured physical variable, which is measured by a controller, a control voltage is transmitted to the control voltage source 76. This signal is then transmitted to the degenerated common emitter transistor 72, which is designed to convert the voltage to current with a high source impedance. The collector 71 is designed to have a very high impedance so that the current in the degenerated common emitter transistor 72 passes through the collector 71 to the capacitor 70. In normal operation, the emitter 74 would be controlled by the voltage in the voltage source 76. The size of the resistor 75 determines the current between the B+ conductor 57 and the emitter 74 and hence across the transistor 72. In essence, therefore, the voltage across the transistor 72 merely controls a collector current inasmuch as the current passes through the collector 71. Current passing through the collector 71 will charge the capacitor 70 until the capacitor reaches its saturation point. Consequently, it can be seen that a constant current application is maintained on the unijunction transistor 64. Similarly, the transistor 72 is designed to provide a constant current source regardless of the load maintained thereon, or of the voltage level, because of the high source impedance.

The unijunction transistor 64, which serves as the relaxation oscillator delivers a current pulse from the base–1 65 thereof into the gate 61 of the silicon controlled rectifier 60 at a controllable time in the cycle of the supply voltage from the source of electrical current. When the silicon controlled rectifier 60 receives a signal, it will begin to conduct and will continue to conduct until the current attempts to reverse, at which time conventional diode action stops the current flow. However current flow to the unijunction transistor 64 will continue from the capacitor 70. The operation of the relaxation oscillator uses the principle of the unijunction transistor 64 that conduction between the emitter 67 and base–1 65 is prevented unless the emitter-to-base–1 voltage is greater than a critical value, that critical value being determined by the base–2 voltage to the base–1 voltage. When this peak voltage is exceeded, the effective resistance between the emitter 67 and the base–1 drops and approaches a zero level. Conduction should normally continue until the emitter-to-base–1 voltage drops below the valley point voltage.

The control voltage source 76, the feedback voltage and the set point of the set point potentiometer 77 determines the firing time of the unijunction transistor 64. The transistor 72 in combination with the capacitor 79 thus provides a constant current source, the size of the current being determined by the control voltage applied to the transistor 72.

If the unijunction transistor 64 is in a conductive state, current flow will be maintained from the base 73 of the transistor 72 to the emitter 67 of the unijunction transistor 64. If the unijunction transistor 64 is in a non-conductive state, that is, it is not firing, the constant current flow from the degenerated common emitter transistor 72 will charge the capacitor 70. When the unijunction transistor 64 is rendered conductive, the capacitor 70 will discharge to the emitter 67 of the unijunction transistor 64. The maximum steady state current in the unijunction transistor 64 must be less than the valley point current. The emitter 67 is a back-biased generally until there is sufficient voltage build-up across the emitter 67. However, during the time of the voltage rise at the emitter 67, the voltage difference maintained between the base–1 65 and the base–2 66 will be constant. When the voltage at the emitter 67 reaches its critical value, the unijunction transistor 64 will fire, thereby discharging the capacitor 70 through the resistor 69, permitting current flow into the gate 61 of the silicon controlled rectifier 60.

This pulse of current to the gate 61 of the silicon controlled rectifier 60 will cause the rectifier 60 to fire and to begin to supply current to the solenoid coil 3. When the control current is less than the critical value, the capacitor 70 will not have charged to the firing voltage by the end of the positive cycle. After the unijunction transistor 64 has fired, the capacitor 70 will immediately begin to recharge, and if the current is high enough, it may fire again before the end of the next cycle. However, since the silicon controlled rectifier 60 will already be in the conducting state, this additional pulse caused by the firing of the capacitor 70 will have no effect.

Figure 6:
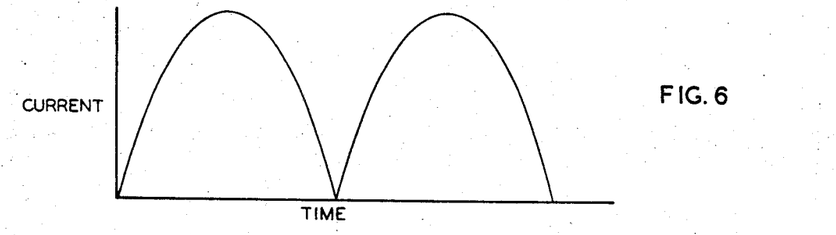
FIGURE 6 is a full-wave rectified control voltage applied to a silicon controlled rectifier forming part of the control circuit.
Figure 7:
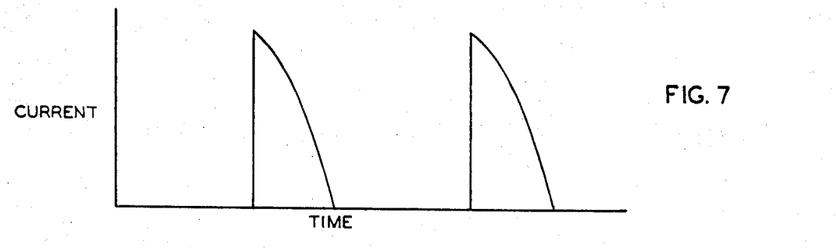
FIGURE 7 is a half-wave form of a rectified voltage applied to a silicon controlled rectifier and used with a resistive load.

In the electrical circuits which employ a resistive load, there is generally a long quiescent period between current pulses. FIGURE 6 illustrates the current pulse produced when there is an inductive load in the solenoid coil 3. FIGURE 7 illustrates the current pulse produced when there is a resistive load in the solenoid coil 3. In the present case, there is no quiescent period because of the fact that an inductive load occurs and the current pulse has the form as illustrated in FIGURE 6. It is known that in an inductive load, the current always lags the voltage so that the voltage may go to zero but the current will still be flowing through the silicon controlled rectifier and consequently, the silicon controlled rectifier cannot turn off. In the case where there is the inductive load, the current may drop but the next voltage pulse is sufficiently close so that the silicon controlled rectifier will remain in the conducting condition.

Figure 8:
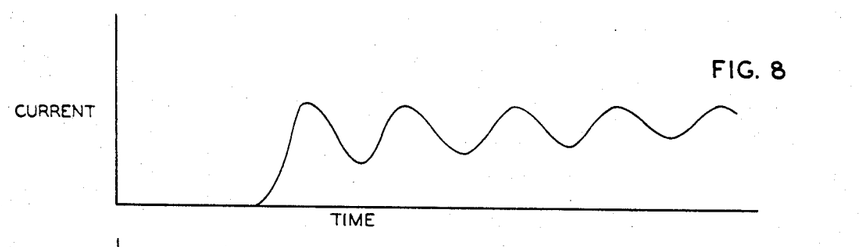
FIGURE 8 is a diagrammatic view showing the wave form of a supply current to a silicon controlled rectifier without the employment of a free-wheeling diode in the control circuit.
Figure 9:
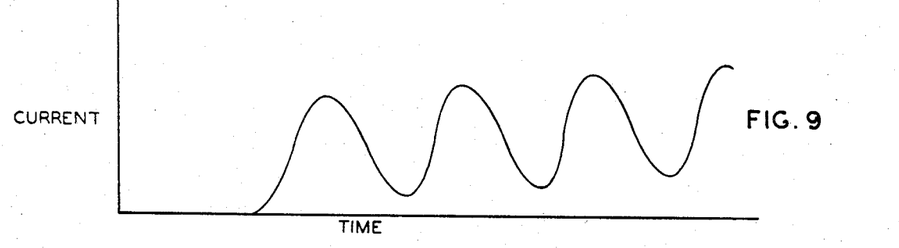
FIGURE 9 is a diagrammatic view of a wave form of the control current applied to the silicon controlled rectifier in the circuit of FIGURE 5, when a free-wheeling diode is shunted across the solenoid coil of the control valve.
Figure 10:
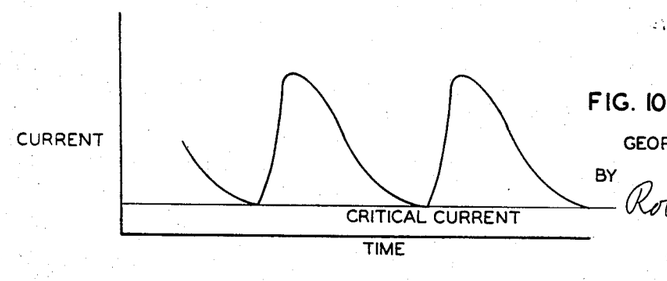
FIGURE 10 is a diagrammatic view of the equilibrium steady state current applied to the solenoid coil forming part of the control valve of FIGURE 1.

The employment of the free-wheeling diode 63 overcomes this problem. When the current is discontinued to the silicon controlled rectifier 60, it will flow through a circuitous path from the solenoid coil 3 to the free-wheeling diode 63. This condition will occur when the voltage at the silicon controlled rectifier is sufficiently high so that the rectifier may turn off. As this occurs, it will achieve an inductive decay as illustrated in FIGURE 9. The curve of FIGURE 8 illustrates the wave form achieved if the free-wheeling diode is eliminated. It is to be noted that at each point, the current never goes to zero and reaches a slightly higher minimum value until a steady state equilibrium is achieved such as illustrated in FIGURE 10. Consequently, there is a minimum and maximum current level. Referring again to FIGURE 10, it can be seen that there is a critical voltage at which the silicon controlled rectifier 60 will fire.

It can be seen that the half-wave silicon controlled rectifier power supply used with the pulsed solenoid control valve described in my copending application Ser. No. 412,921, filed Nov. 23, 1964, would not permit the reverse mode of operation as employed herein. As indicated above, this was due to the long period of the negative half-cycle in which no magnetic force is generated, thus permitting the valve to move to the open position. The full-wave direct current silicon controlled rectifier power supply therefore overcomes this problem. In the present circuit, the maximum magnetic force is generated shortly after the firing of the silicon controlled rectifier which occurs two times in every cycle of the supply voltage. Following the silicon controlled rectifier firing, the current reaches a maximum and begins to decline up to the point where the voltage across the solenoid coil reverses. At this time, the free-wheeling diode will divert the coil current from the silicon controlled rectifier allowing it to commutate and the coil current is dissipated by a current-resistance drop in the coil. This inductive decay which has been illustrated in FIGURE 9 will continue until the next firing of the silicon controlled rectifier when the cycle again repeats itself. The amplitude of vibration of the plunger can be increased by decreasing the minimum value of the current or by increasing the time the current is lower than the critical 0– vibration current.

OPERATION OF THE CONTROL VALVE

In my aforementioned copending application Ser. No. 412,921, filed Nov. 23, 1964, which related to a normally closed pulsed-solenoid control valve, the control action is explained on the theory that the plunger is made to vibrate to an orifice by magnetic force and that the flow control results from controlling the amplitude of vibrations of the valve plunger. This concept permitted a quantitative description of the operable range of control and which was set forth in said application. In the normally closed valve, the two major conditions which must exist under the theory that flow control results from controlled vibration of a plunger is that the magnetic force generated by the solenoid coil must be greater than the combined spring and gravity forces which holds the plunger against the valve seat. The second condition is that the magnetic force averaged over the power cycle must be less than the force exerted by the spring.

The pulsed-solenoid control valve of the present invention is a normally open device where the movable plunger is biased away from the seating face 16 by any combination of forces, such as by the spring 26, the force of gravity, or differential pressure forces. As previously indicated, the spring force is not necessary inasmuch as the gravity forces and differential pressure forces are a sufficient downward component of force acting on the valve plunger 17. The magnetic force, which biases the valve plunger toward the closed position, is generated by the pulsating DC current of average magnitude which is sufficient to overcome the opening bias force. However, the minimum magnetic force is less than this bias force. In this manner, the plunger is, on the average, held against the seat, but vibration off of the seat is permitted by the current reduction accompanying the so-called "negative pulses."

The magnetic force in the solenoid coil 3 naturally must have a DC component which is large enough to hold the valve plunger 17 against the upper stop 16. When the flow-to-open pattern is selected, no bias spring is necessary to open the valve. With a large seat area, the force balance principle applied to the control valve products, in effect, a "pop-off" valve, where the pop-off point can be controlled by controlling the electrical current to the coil. This action can be obtained with pulsation of current as in the case of the previously described normally closed pulsed-solenoid control valve, or without pulsation of current. It is important that the seating ring 25 be sufficiently flexible to engage the seating surface 16, thereby preventing any fluid flow when the valve plunger 17 is moved to its uppermost position. However, the seating ring 25 must be sufficiently rigid to prevent a contact of the valve plunger 17 with any portion of the plug 11. In the case of the control valve of the present invention, it is possible to drop the current level below the critical firing level and not obtain any fluid flow. This phenomenon is due to the fact that there is not sufficient time for the relaxation of deformation of the valve seating ring 25. FIGURE 10 illustrates the steady state current pulse produced by the silicon controlled rectifier 60. As the minimum current level is reduced, it will drop below the critical current level, but the valve plunger will not be sufficiently moved in order to provide fluid flow to the flexure of the seating ring 25. In essence, there is the balancing of the magnetic force against the differential pressure force across the valve. Accordingly, it can be seen that the valve plunger 17 does not have to vibrate. However, vibration is desirable in order to obtain an average of the force systems acting on the valve plunger and thereby reduce any hysteresis problem. The hysteresis would exist from the seat deformation force and the magnetic memory which would be obtained when the valve plunger 17 is shifted to the closed or uppermost position. In fact if the magnetic force, which was equivalent to the square of the current to the coil 3, was plotted as a function of the differential pressure force across the valve, a linear relation is achieved in the rheoterical condition. However, in actual practice a hysteresis curve is produced. The employment of a "dither" or vibratory action on the valve plunger would average this hysteresis to produce a single linear relationship.

PLANT SCALE ELECTRICALLY OPERATED CONTROL VALVE

Figures 11, 12:
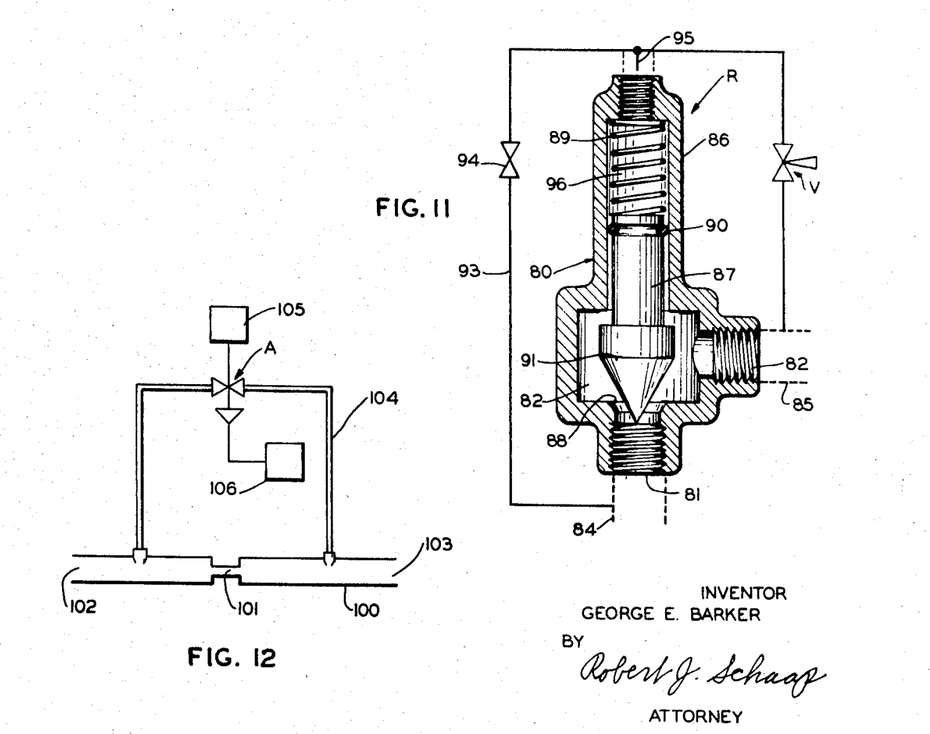
FIGURE 11 is a schematic view, partially in section, of a plant-scale electrically operated control valve which employs the valve of FIGURE 1 as a pilot control valve.
FIGURE 12 is a schematic view illustrating the use of the pulsed-solenoid control valve as a differential pressure sensor.

It is possible to provide a plant-scale electrically operated control valve P which employs the previously described control valve A and control circuit C, substantially as illustrated in FIGURE 11. The plant-scale electrically operable control valve P generally comprises a valve housing 80 having fluid ports 81, 82 which communicate with a large internal fluid chamber 83, the fluid ports 81, 82 being provided with inlet and outlet lines 84, 85 respectively. The valve housing 80 is integrally provided with an upstanding hollowed-out tube 86 for accommodating a valve plunger 87. The valve plunger 87 is biased toward a seat 88 formed by the inlet port 81, by means of a compression spring 89, which is interposed between the head portion of the plunger 87 and the underside of the tube 86, substantially as shown in FIGURE 5. The valve plunger 87 is preferably provided with a Teflon O ring seal 90. The valve plunger 87 is further provided with an inlarged plug 91 at its lower end. The plug 91 is tapered so that the area of the upper chamber hereinafter described is substantially equal to the area of the main valve seat. With this condition, downstream pressure variations do not affect the position of the main valve.

Connected between the inlet and outlet ports, substantially as shown in FIGURE 11 is a fluid control tube 93 which is provided with a fixed orifice 94 and a tube 95 which communicates with a chamber 96 formed by the head of the valve plunger 87, and the wall of the tube 86. Interposed in the fluid control tube 93 on the downstream side is the electrically operable control valve A and controller circuit C which serves as a pilot valve V.

Thus, it can be seen that the pilot flow passes through a fixed orifice and the pressure existing between the fixed orifice 94 and the pilot valve V is applied to the upper dome or chamber 96 of the control valve P. The stem of the valve plunger 87 is exposed to this control pressure with isolation from the mainstream arriving at the valve through the port 81, by means of the sliding O ring seal 90.

The operation of the pilot operated control valve P can be explained by analyzing the action of the valve P under open-loop control action since there will then be no feedback signal to the valve P. In this type of analyses, the valve P can be assumed to be a "let-down" valve. In the "let-down" valve, the upstream pressure is to be maintained constant and the downstream pressure is constant at a lower pressure than the upstream pressure. The open-loop control action can be explained by assuming that the upstream pressure which is constant, determines the flow through the main valve P as a function of the pilot control valve V flow. While it is not essential to the operation of the valve, it can be assumed for purposes of explanation that the area of the upper chamber, that is the area of the chamber 96 is equal to the cross-sectional area of the seat 88. Assuming this condition, the downstream pressure variations do not affect the position of the main valve plunger 87.

In operation, if the pilot valve V is closed, the spring 89 will hold the valve plunger 87 in closurewise position over the valve seat 88 since there will be no differential pressure force on the valve plunger 87. If however, a pilot flow is started through the pilot control valve V, in response to a change of a measured physical variable, the pressure drop across the fixed orifice 94 will result in a lower pressure being applied to the upper chamber 96. This differential pressure multiplied by the valve plunger cross-sectional area produces a net upward force on the valve plunger 87. When this upwardly exerted force equals the downwardly exerted force of the spring 89, the main valve plunger 87 will begin to lift from the seat 88 and permit flow through the main valve P. As pilot flow is further increased through the pilot valve V, in response to changes of a measured physical variable, the differential pressure force will be balanced by the increased spring force resulting from the greater valve lift. It can thus be seen that the plunger lift is proportional to the pilot flow rate through the pilot valve V minus the pilot rate when the main flow through the valve P commences. Thus, the pilot operated control valve P serves as an effective hydraulic amplifier.

Inasmuch as the pilot valve V is a normally open valve, the valve plunger 87 will be maintained in the open position in the event of a power failure of the pilot valve control system. If it is desirable to have the main control valve P open in the event of a power failure in the pilot valve V, it is only necessary to reverse the position of the fixed orifice 94 and the pilot valve V. In normal operation, the pilot valve V will be given a signal which will control its average valve opening and hence fluid flow, so that pilot flow will be determined by the valve pressure drop, that is the pressure differential between upstream and downstream pressures, as well as by the series resistance of the fixed orifice 94 and the pilot valve V. Thus, as the pilot flow increases, the increased main flow through the valve P will reduce the available pilot flow pressure drop and consequently reduce the main flow through the valve P. This effect definitely tends to increase the stability of the system although it does place a finite upper limit on the flow rate through the main valve P. However, this does not present any problem inasmuch as the main valve P can be designed so that it will accommodate a maximum desired flow rate.

This type of pilot operated control valve has a number of advantages over the conventional air-operated control valves in that it eliminates air or hydraulic transduction and in fact, the need for a plant air system. Moreover, this type of pilot operated control valve has an extremely high speed of response and a much lower operating cost than for conventional control systems. This type of control valve also eliminates the need for an external stuffing box with its inherent hysteresis. The plant-scale electrically operated control valve can be used in a multitude of applications with the same versatility as the pulsed solenoid control valve which serves as the pilot valve V in the plant-scale control valve P. Thus, the plant-scale electrically operated control valve can be used as a liquid level controller, a differential pressure controller or a temperature controller.

The pulsed-solenoid control valve of the present invention also effectively serves as a force-balance device similar to the device described in my copending application Ser. No. 854,244, filed May 24, 1965, and which relates to pulsed-solenoid, force-balance devices. If the electrically operated control valve is considered as a flow control device, the effect of a pressure differential across the valve seat is considered a detriment to operation since the "set-point" of the valve changes with differential pressure. However if the valve is considered as a force-balance device, this effect operates to the advantage of the valve.

A diametrally reduced portion or fixed restriction (not shown) may be interposed in the discharge line connected to the discharge port of the control valve A to produce a force balance device. The placing of this fixed restriction on the downstream side of the control valve A produces a unique result of increased stability through internal feedback or so-called "negative feedback." The theory of providing increased stability by means of negative feedback can be realized by analysis of the valve at very low flow rates. The valve plunger will not move from its closurewise position in the control valve A until the differential pressure forces acting on the valve exceed the magnetic forces holding the valve plunger in the closed position. To analyze this in another way, the valve plunger will not move from its closurewise position until the magnetic forces are sufficiently reduced below the pressure differential forces urging the valve away from the closed position. When the maximum magnetic force is then reduced to a point where it equals the resultant of the other forces on the valve plunger, the plunger will be shifted downwardly from the seated position. Thus, it can be seen that while the flow-to-open pattern is employed in the present device, the pressure differential across the valve seat plus the spring force is employed which urge the plunger to an open position will oppose the electromagnetic force holding the plunger in the closed position. Therefore, the differential pressure across the valve seat will determine the point when flow begins for a given maximum magnetic force.

Aside from the fact that the "internal feedback" or so-called "negative feedback" produces an increased stability, this factor also provides uniqueness to the device A in that it is capable of being used as a resistance-pneumatic transducer with a linear characteristic. The transistorized control circuit C is used to produce a valve wave form so that a control resistance can yield a linear variation of the pressure downstream of the control valve. The flow rate is, therefore, a linear function of the control resistance instead of an exponential function normally obtained.

A resistance or voltage-pneumatic transducer of the type described would find excellent use in control applications in which the final control element is pneumatically operated. This type of transducer would, in effect, functionally convert a resistance input signal into a linearly proportional pneumatic output pressure.

The control valve A can also be used as a differential pressure sensor or so-called D.P. sensor, as schematically illustrated in FIGURE 12. A fixed restriction is preferably, though not necessarily, placed in a downstream position. By reference thereto, it can be seen that the control valve A is connected across a fluid conduit or pipe 100 having an internal restriction 101, thereby forming a high pressure area 102 within the conduit 100 and a low pressure area 103. The control valve A is interposed in a by-pass line 104 connected across the high pressure area 102 and the low pressure area 103. A variable reluctance device or vibration sensor 105 is also connected to the solenoid coil 3. Similarly connected to the output of the coil is an electrical readout device 106. In order to employ the control valve A as a differential pressure sensor, it is necessary to measure the curent at an equilibrium or balanced position.

The minimum current level would, therefore, provide the change in pressure. This would be, of course, in relative terms and the electrical readout device 106 could be calibrated in an absolute indicia to give a direct pressure reading as a function of the peak current produced in the solenoid coil. Thus, if it is desired to measure the change of pressure, it is necessary to know when vibration of the valve plunger begins. This, of course, is determnied by the variable reluctance device 105. It is also possible to interpose a flow meter in the by-pass line 104 in order to determine when flow begins. These devices will indicate when the valve is at least in its equilibrium position and when flow begins or vibration is initiated. Thereafter, as a change of pressure occurs between the high pressure area 102 and the low pressure area 103, the flow conditions in the by-pass line 104 will change thereby either increasing or reducing the pressure across the valve orifice. As a result thereof, the amplitude of vibration of the valve plunger will change within the solenoid coil. This will, in turn, produce a change in the electrical output from the solenoid coil. As indicated above, this electrical output is then, in turn, transmitted to the electrical readout device 106. In this manner, it is possible to measure the change of pressure across the fixed restriction 101 in the line 100 by use of the control valve A.

APPLICATION OF CONTROL VALVE

As indicated above, the control valve A can be designed to include its own internal feedback and, therefore, exhibit stable performance over a wide range of operating variables. Accordingly, the control valve A is very suitable for use in many fedback control applications where external feedback is employed such as in liquid level control applications and pressure control applications. Moreover, the control valve A could be modified and employed as an absolute pressure control system, a gauge pressure control system and a temperature controller, for example. In order to modify the control circuit C into that of a flow controller, it is only necessary to use a differential manometer with a suitable sensory mechanism. In order to provide a pressure controller, it is only necessary to replace the control voltage source 76 with a pressure transducer to give an equivalent resistance change. If it were desired to modify the control valve A to make a temperature controller, it is only necessary to replace the control voltage source with a suitable thermistor used as a sensor.

By way of illustration, but not of limitation, the use of the pulsed-solenoid control valve A is exemplified by employment in a liquid level control application and a pressure control application.

In order to modify the pulsed-solenoid control valve A into a liquid level controller, the control circuit of FIGURE 5 is slightly altered. The element "control voltage" represented by control voltage 76 is replaced by a cadmium sulfide resistance light sensitive transducer, often termed "sensor," which is used in conjunction with a light source for sensing changes of liquid level within a tube. It is necessary to employ a constant voltage D.C. source of electrical current. A constant fixed resistor is connected to one terminal of the cadmium sulfide transducer and the other terminal of the resistor is connected to the D.C. source, so that a voltage measuring resistor is interposed between the D.C. source and the light sensitive transducer. In this manner, the voltage across the resistor can be measured by direct proportion to changes sensed by the cadmium sulfide transducer. The cadmium sulfide sensor is connected to a proportional band potentiometer and to the movable element of a reset potentiometer which may, in turn, be connected to another reset potentiometer. One reset potentiometer would serve as a means for wide range adjustment whereas the other reset potentiometer would serve as a means of final adjustment. These components forming part of the liquid level controller, namely the sensor, light source and potentiometer are neither illustrated nor described in detail herein. This control system is more fully described and illustrated in my copending application Ser. No. 412,921, filed Nov. 23, 1964, of which this application is a continuation-in-part.

The actual sensing method of liquid level change was the refraction setting of a photocell, substantially as described in my copending application Ser. No. 323,383, filed Nov. 13, 1963. The basic transducer is a cadmium sulfide photocell, the resistance of which decreases as light intensity increases. A collimated light source is directed perpendicular to the axis of the liquid level tube in a position off-center to the axis of the tube. The liquid in the tube has a higher index of refraction than the vapor phase and this causes the light beam to be refracted laterally when liquid is present. The cadmium sulfide receiver is mounted in a lateral position so that its light slit is illuminated when liquid is present and masked by the slit when vapor is present. While the liquid itself is used to provide change in light intensity by virtue of its refractive index, it should be understood that sensing by this method is equally efficient with clear or colored liquids.

Each of the potentiometers shunts the cadmium sulfide sensor and serves as a proportional band adjustment. One potentiometer provides course adjustment whereas the other potentiometer provides fine adjustment and serves as a method of resetting the flow rate. It has been found that liquid level controllers which embody the pulsed-solenoid force-balance control valve A are very stable. This type of liquid level controller shows considerable utility by the extreme versatility of the control circuit. Moreover, it is possible to generate proportional level control with a proportional band up to 0.5 inch by this method.

The pulsed-solenoid control valve A can also be modified for adaptation in a pressure control system. For pressure control operations, the cadmium sulfide photocell can be operatively connected to a pressure gauge (not shown) having a dial plate with conventional pressure graduations. The dial plate of the pressure gauge can be conveniently provided with an aperture in direct alignment with the photocell. A light source is then conveniently mounted in alignment with the photocell in the aperture. A control flag is secured to the indicator needle of the pressure gauge and is capable of being shifted to and away from closurewise position across the aperture. As the pressure in a measured variable function is increased, the control needle of the valve will be shifted carrying therewith the control flag. As the control flag shifts across the aperture to its closurewise position, the light incident upon the photocell is reduced. As the light upon the photocell is reduced, the current supplied to the relaxation oscillator is, therefore, reduced. Consequently, it can be seen that the signal received from the sensory transducer is related to the movement of the control flag and is hence related to the change of pressure. It has also been found that pressure control systems which embody the pulsed-solenoid control valve A are very stable.

This invention is further illustrated by, but not limited to, the following example.

EXAMPLE

The control valve of FIGURE 1 was combined with the control circuit of FIGURE 5 in order to study the effect of the controllable factors which affect the operation of the valve. The valve employed was a Hoke Series 90 solenoid valve which was modified in accordance with the present invention. The control valve had the following specifications:

| | | |
|---|---|---|
| Plunger weight | gms | 16 |
| Plunger outer diameter | cms | 0.92 |
| Plunger stop outer diameter | cms | 0.84 |
| Plunger cross-sectional area | cms.$^2$ | 0.67 |
| Effective axial plunger length | cms | 4.4 |
| Outer shell, outer diameter of plunger | cms | 4.1 |
| Outer shell thickness | cms | 0.159 |
| Orifice diameter | inch | ⅛ |
| Air gap when plunger seated | do | 0.055 |

The solenoid coil of the control valve is characterized by the following data.

| | | |
|---|---|---|
| Total coil turns | | 4000 |
| DC resistance (including compensator resistors) | ohms | 265 |
| Wire size | ga | 33 |
| Coil inner diameter | cm | 1.35 |
| Coil outer diameter | cm | 2.98 |
| Coil height | cm | 3.15 |

The valve had an all stainless steel construction formed of Type 430F stainless steel with an initial permeability of 200, a maximum permeability of 1400, and a saturation flux density of 14,000 grams. The orifice seating surface was relatively flat and had an overall area of 0.205″×0.185″. The orifice had an outer diameter of 0.245″. The upper end of the plunger was milled to a relatively flat surface and drilled to form a flat-bottomed hole of approximately 0.245″ diameter with a depth of 0.065″. Fixedly disposed within the hole formed in the upper end of the plunger was a rubber sealing "O" ring formed of butadiene acrylonitrile (Buna-N rubber). Additionaly, Teflon tubing with an outer diameter of 0.065″ was fitted into each of the four flutes formed in the valve plunger and which served as radial guides, thereby eliminating friction and reducing unwanted radial vibrations.

The tests indicated that the valve would operate in any position. However, for purposes of producing the data for this example, the valve was operated in a gravity-to-open position.

The valve was next connected to a control circuit which was constructed in conformance with FIGURE 5 with the following parts.

| Part | Reference numeral | Specifications |
|---|---|---|
| Resistor | 57 | 100K ohms. |
| Do | 68 | 2.2K ohms. |
| Do | 69 | 47 ohms. |
| Do | 75 | 10K ohms. |
| Do | 78 | 50K ohms. |
| Do | | 3.5K ohms. |
| Potentiometer | 77 | 10K ohms, 10 turn. |
| Capacitor | 70 | 0.1 mfd., 200 volts. |
| Diode | 53 | 1N1695. |
| Do | 54 | 1N1695. |
| Do | 55 | 1N1695. |
| Do | 56 | 1N1695. |
| Do | 63 | 1N1695. |
| PNP transistor | 72 | 2N3250. |
| Unijunction transistor | 64 | 2N1671. |
| Silicon controlled rectifier | 60 | 2N1597. |
| Zener diode | 79 | 1N1779, 22 volts. |
| Constant voltage transformer | | Sola Cat. No. 23-13-060 120 volts AC. |

Figure 13:
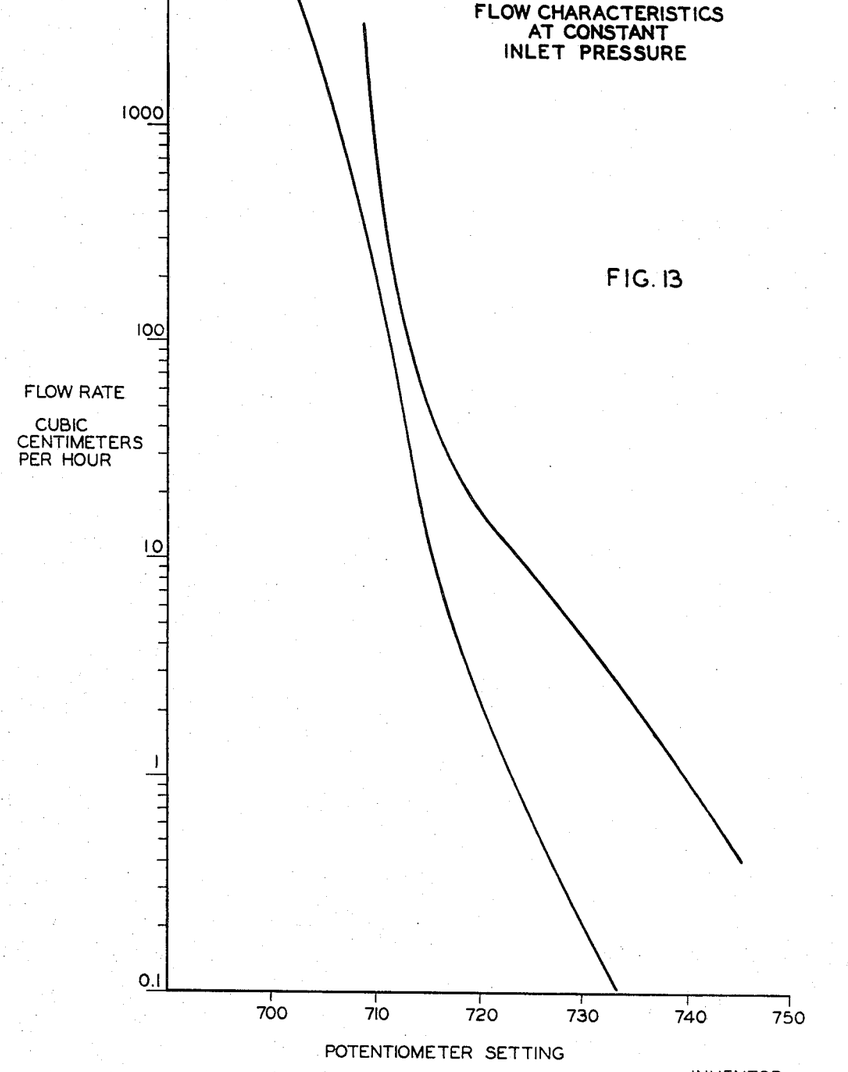
FIGURE 13 is a diagrammatic view showing the flow characteristics of the control valve of FIGURE 1 at constant inlet pressure.

The flow characteristics of the control valve A were determined at a constant inlet pressure and the flow rate was determined as a function of the potentiometer setting for two different pressure differentials across the valve. The first pressure differential was 5 p.s.i.g. and the second differential employed was 20 p.s.i.g. The potentiometer setting, which is directly related to the control voltage is plotted as a function of the flow rate which is logarithmic. The curves illustrating the flow characteristics of the valve are set forth in FIGURE 13. The repeatability of the results was within an area of ±0.002″. The dynamic range of the valve was determined to be greater than .100. The higher curve was produced with a constant inlet pressure of 5 p.s.i.g. and the lower curve was produced with a constant inlet pressure of 20 p.s.i.g. in FIGURE 13.

Having thus described my invention, what I desire to claim and secure by Letters Patent is:

1. The method of controlling the effective valve opening of a control valve having a movable element and wherein the movable element is capable of shifting in a first direction to a first end position having a valve seat thereat and a second direction toward a travel limiting physical abutment located at a remote position with respect to said first end position; said method comprising biasing said element with a substantially constant force in said second direction towards said remote position and travel limiting physical abutment, generating an electrical current having a desired power level, transmitting said current to a solenoid coil to produce a magnetically generated force of desired magnitude, applying the magnetically generated force to said movable element tending to bias said element in said first direction towards said first end position where it engages said valve seat and is disposed in closurewise position over a valve opening in said valve seat and where movement of the element is restricted at said valve opening by said valve seat, controlling the lift-time history of the movable element in response to the magnitude and duration of the magnetically generated force so that the maximum magnetically generated force is greater than said substantially constant force and that the average of the magnetically generated forces magnitude and duration is less than the substantially constant force to thereby cause a repetitive cycle of the movable element, which cycle comprises an opening period, a closing period and a quiescent period, such that during the opening period the movable element never contacts the travel limiting physical abutment, and during the quiescent period the movable element assumes a position of dynamic rest with simultaneous zero velocity and zero acceleration, whereby the time integral of the lift-time history of the movable element determines the effective valve opening.

2. The method of controlling the effective valve opening of claim 1 further characterized in that the substantially constant force biasing the movable element in the second direction is a mechanical force and that the lift-time history of the movable element is controlled by controlling the current-time history of the electrical current to the solenoid thereby causing the repetitive cycle of the movable element.

3. The method of controlling the effective valve opening of a control valve of claim 1 further characterized in that the generation of the electrical current is in the form of a series of electrical signals and the magnetically generated force is in the form of a series of successive force pulses.

4. The method of controlling the effective valve opening of a control valve of claim 3 further characterized in that the controlling of the lift-time history includes the controlling of the duration of said electrical current signals during generation thereof to produce a net unbalance of forces on said movable element tending to bias same to said first end position.

5. The method of claim 1 further characterized in that the effective valve opening and fluid flow therethrough is controlled in response to changes of a measured physical variable, and that the measured physical variable is sensed for changes thereof and the electrical current is generated in response to changes in the measured physical variable.

6. The method of claim 5 further characterized in that the physical variable is liquid level.

7. The method of controlling the effective valve opening of a control valve having a movable element and wherein the movable element is capable of shifting in a first direction to a first end position having a valve seat thereat and a second direction toward a travel limiting physical abutment located at a remote position with respect to said first end position; said method comprising biasing said element with a substantially constant force in said second direction towards said remote position and travel limiting physical abutment, generating electrical current pulses, transmitting said current pulses to a solenoid coil to produce magnetically generated force pulses, applying the magnetically generated force pulses to said movable element tending to bias said element in said first direction towards said first end position where it engages a valve seat and is disposed in closurewise position over a valve opening in said valve seat and where movement of the element is restricted at said valve opening by said valve seat, controlling the lift-time history of the movable element for each pulse of the force pulses in accordance with the repetition rate of the force pulses and the maximum and the average magnitude of each force pulse whereby the movable element will shift toward the first end position for each force pulse in proportion to the maximum magnitude thereof to thereby cause a repetitive cycle of the movable element, which cycle comprises an opening period, a closing period and a quiescent period, such that during the opening period the movable element never contacts the travel limiting physical abutment, and during the quiescent period the movable element assumes a position of dynamic rest with simultaneous zero velocity and zero acceleration, whereby the time integral of the lift-time history of the movable element determines the effective valve opening.

References Cited

UNITED STATES PATENTS

| 2,677,524 | 5/1954 | Parsons | 251—139 |
|---|---|---|---|
| 2,695,685 | 11/1954 | Jamison | 251—139 |
| 2,843,147 | 7/1958 | Penther | 251—131 |
| 3,064,936 | 11/1962 | Strauss | 251—141 |
| 2,812,776 | 11/1957 | Lofftus et al. | 251—129 X |
| 2,835,468 | 5/1958 | Sparks | 251—129 X |
| 2,874,718 | 2/1959 | Kelly | 251—332 X |
| 2,985,424 | 5/1961 | Anderson et al. | 251—368 X |
| 3,321,177 | 5/1967 | Fendel et al. | 251—332 X |

FOREIGN PATENTS

| 574,387 | 3/1924 | France. |
|---|---|---|
| 925,507 | 3/1947 | France. |
| 494,316 | 7/1953 | Canada. |

ARNOLD ROSENTHAL, Primary Examiner

U.S. Cl. X.R.

137—487.5; 251—30, 139, 141, 333; 317—148.5